(12) United States Patent
Takahashi

(10) Patent No.: US 8,851,653 B2
(45) Date of Patent: Oct. 7, 2014

(54) LIQUID DISCHARGING APPARATUS

(75) Inventor: Hayato Takahashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 13/402,460

(22) Filed: Feb. 22, 2012

(65) Prior Publication Data

US 2012/0218326 A1    Aug. 30, 2012

(30) Foreign Application Priority Data

Feb. 24, 2011 (JP) ................................ 2011-038734

(51) Int. Cl.
*B41J 2/01*    (2006.01)

(52) U.S. Cl.
USPC .................................. 347/101; 347/5; 347/9

(58) Field of Classification Search
USPC ....................... 347/5, 9, 101, 12, 14; 358/1.17
See application file for complete search history.

(56) References Cited

U.S. PATENT DOCUMENTS 8,052,271 B2 * 11/2011 Kunimine et al. ............ 347/101
2008/0266605 A1 10/2008 Nishide

FOREIGN PATENT DOCUMENTS

| JP | 2-58366 | 2/1990 |
| JP | 2010-287098 | 12/2010 |

OTHER PUBLICATIONS

Extended European Search Report dated Jun. 20, 2012 for European Patent Application No. 12156486.8.

* cited by examiner

*Primary Examiner* — Lam S Nguyen

(74) *Attorney, Agent, or Firm* — Workman Nydegger

(57) ABSTRACT

A liquid discharging apparatus includes a liquid discharging section which performs a liquid discharging operation for discharging liquid; and a controller which forms a plurality of images on a medium and also forms coating of the images, by executing a pass which makes the liquid discharging section perform the liquid discharging operation while moving the liquid discharging section in a movement direction, wherein the controller forms a common image portion that is an image site common to each of the plurality of images by a predetermined number of passes and forms respectively a variable image portion that is an image site which differs in each of the plurality of images and the coating of the images by a number of passes smaller than the predetermined number.

4 Claims, 12 Drawing Sheets

1st PRINT FORMAT (4-PASS) PD1

COMMON + VARIABLE

2nd PRINT FORMAT (4-PASS) PD2

1st PRINT FORMAT (4-PASS) PD1'

| ABC | ABC | ABC | ABC |
| ABC | ABC | ABC | ABC |
| ABC | ABC | ABC | ABC |
| ABC | ABC | ABC | ABC |
| ABC | ABC | ABC | ABC |

COMMON

FIG. 9B

2nd PRINT FORMAT (4-PASS) PD1"

VARIABLE

FIG. 9C

3rd PRINT FORMAT (4-PASS) PD2

OP

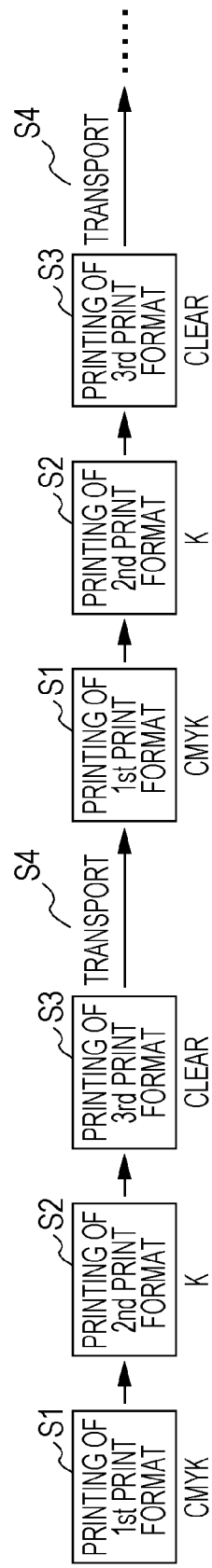

FIG. 11A

1st PRINT FORMAT PD11
(4-PASS)

| ABC | ABC | ABC | ABC |
|-----|-----|-----|-----|
| ABC | ABC | ABC | ABC |
| ABC | ABC | ABC | ABC |
| ABC | ABC | ABC | ABC |
| ABC | ABC | ABC | ABC |

COMMON

FIG. 11B

2nd PRINT FORMAT PD12
(2-PASS)

VARIABLE

FIG. 11C

3rd PRINT FORMAT PD13
(2-PASS)

OP

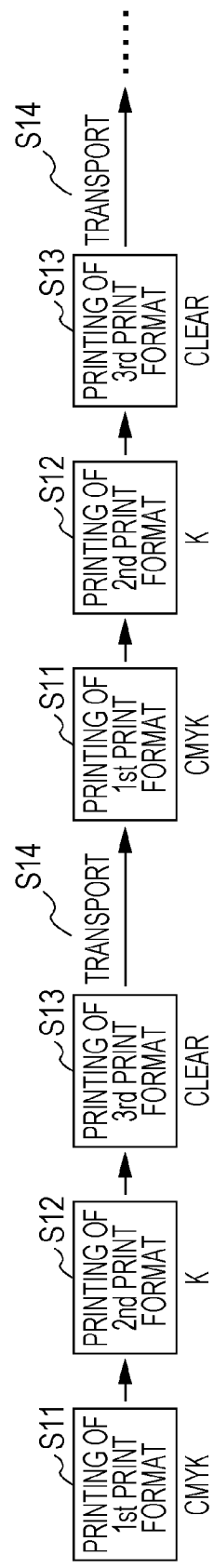

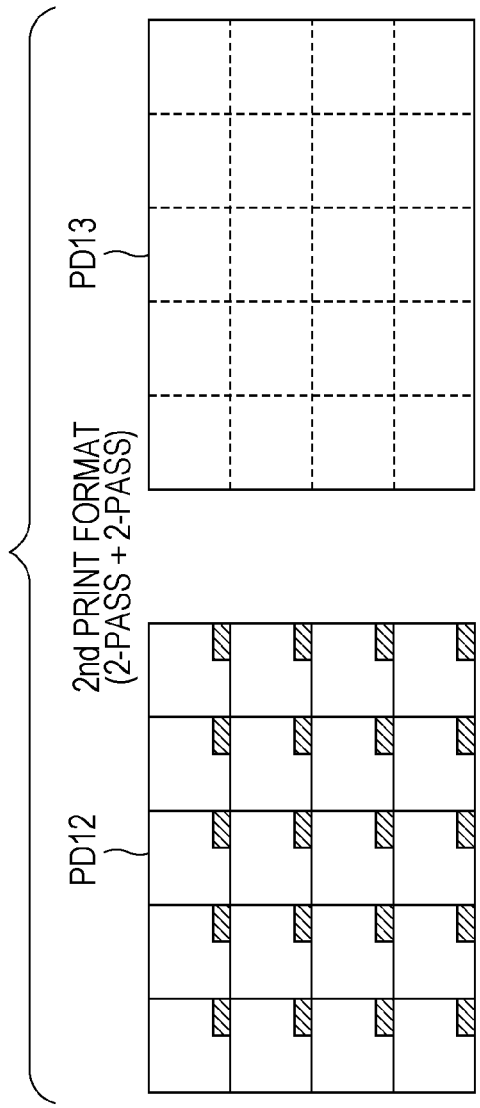

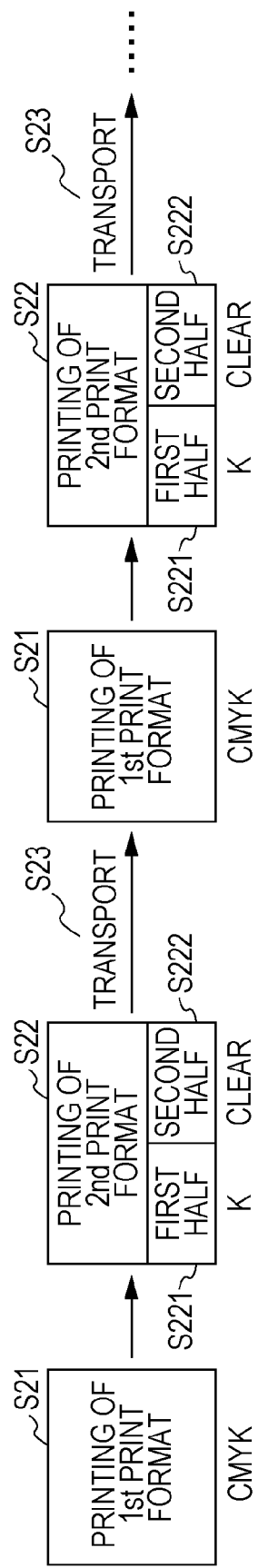

LIQUID DISCHARGING APPARATUS

This application claims the benefit of Japanese Application No. 2011-038734, filed Feb. 24, 2011, all of which is hereby incorporated by reference.

BACKGROUND

1. Technical Field

The present invention relates to a liquid discharging apparatus.

2. Related Art

As a liquid discharging apparatus, an ink jet type printer which prints an image on a medium (for example, paper) by discharging ink that is one type of liquid onto the medium is known. As such a printer, a printer which prints a painting, a graphic, a symbol (a character), a bar-code, or the like on a label is also known (refer to JP-A-2-58366, for example). Further, in such a printer, print processing is sometimes repeatedly performed on the same printing area (page) of the medium. For example, there is a case where after an image is formed by color ink, by applying colorless and transparent ink (clear ink) onto the image, coating of the surface of the image is performed.

Incidentally, in the above-mentioned label printing or the like, a plurality of images is sometimes printed on one print side (page) and a site (a common image portion) common to the plurality of images and a site (a variable image portion) which differs in each of the plurality of images are sometimes included. In the case of printing such an image over plural pages, there is concern that the printing speed may be decreased, as described later.

SUMMARY

An advantage of some aspects of the invention is that it attains improvement in printing speed.

According to an aspect of the invention, there is provided a liquid discharging apparatus including: a liquid discharging section which performs a liquid discharging operation for discharging liquid; and a controller which forms a plurality of images on a medium and also forms coating of the images, by executing a pass which makes the liquid discharging section perform the liquid discharging operation while moving the liquid discharging section in a movement direction, wherein the controller forms a common image portion that is an image site common to each of the plurality of images by a predetermined number of passes and forms respectively a variable image portion that is an image site which differs in each of the plurality of images and the coating of the images by a number of passes smaller than the predetermined number.

Other features of the invention will be apparent from the description of this specification and the accompanying drawings.

BRIEF DESCRIPTION OF THE DRAWINGS

The invention will be described with reference to the accompanying drawings, wherein like numbers reference like elements.

FIGS. 9A to 9C are diagrams illustrating printing data for one frame in Comparative Example 2.

FIG. 10 is a schematic diagram illustrating a printing process in Comparative Example 2.

FIGS. 11A to 11C are diagrams illustrating printing data for one frame in a first embodiment.

FIG. 12 is a schematic diagram illustrating a printing process in the first embodiment.

FIGS. 13A and 13B are diagrams illustrating printing data for one frame in a modified example of the first embodiment.

FIG. 14 is a schematic diagram illustrating a printing process in the modified example of the first embodiment.

DESCRIPTION OF EXEMPLARY EMBODIMENTS

Figure 1:
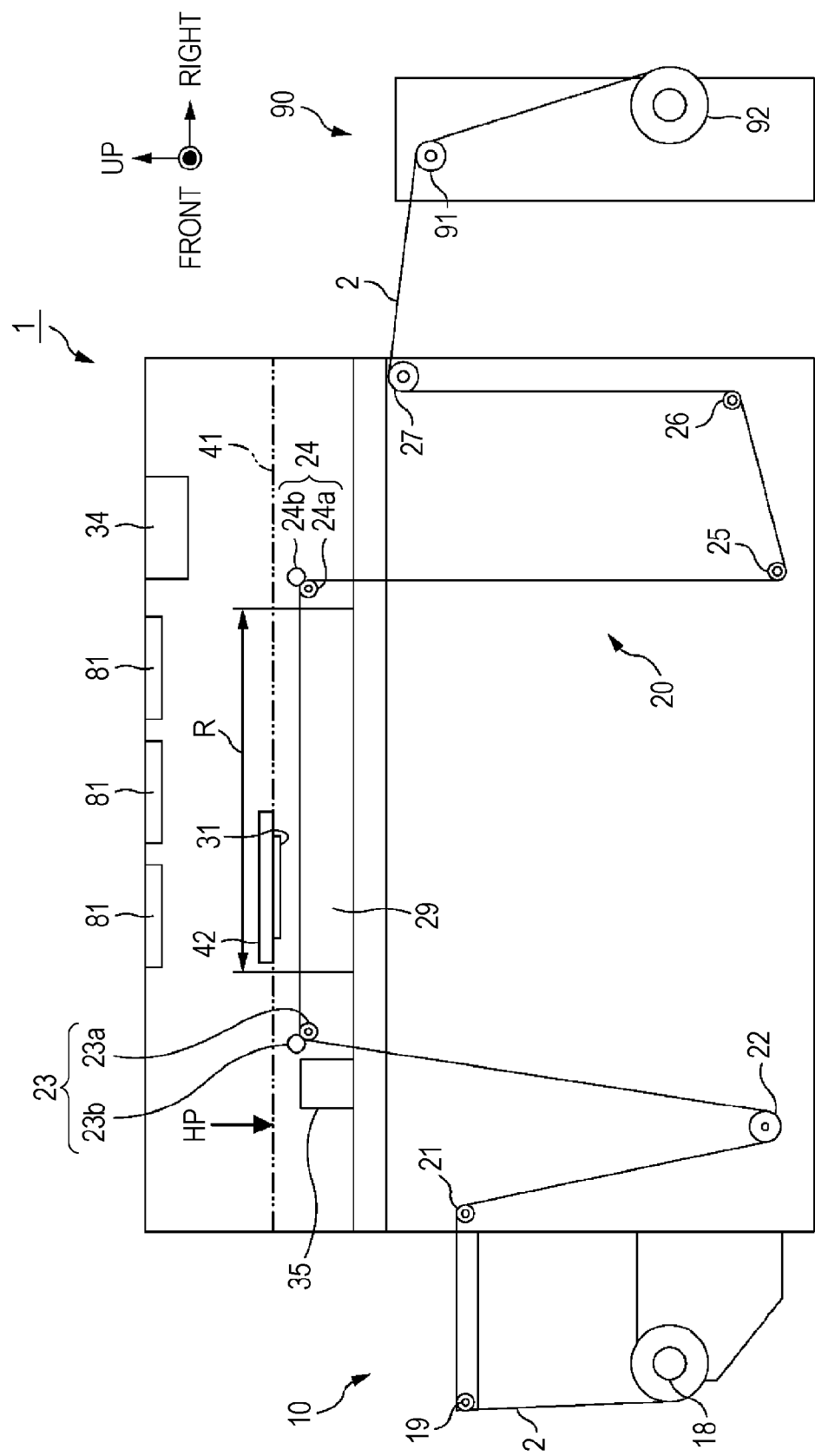
FIG. 1 is a schematic cross-sectional view of a printer.

At least the following matters will become apparent by the descriptions of this specification and the accompanying drawings.

A liquid discharging apparatus including: liquid discharging section which performs a liquid discharging operation for discharging liquid; and a controller which forms a plurality of images on a medium and also forms coating of the images, by executing a pass which makes the liquid discharging section perform the liquid discharging operation while moving the liquid discharging section in a movement direction, wherein the controller forms a common image portion that is an image site common to each of the plurality of images by a predetermined number of passes and forms each of a variable image portion that is an image site which differs in each of the plurality of images and the coating of the images by a number of passes smaller than the predetermined number.

According to such a liquid discharging apparatus, improvement in printing speed can be attained.

Further, the controller may perform first processing of forming the common image portion on the medium on the basis of first printing data and second processing of forming the variable image portion on the medium on the basis of second printing data and also forming the coating of the images on the basis of third printing data, and execute a certain pass in accordance with the second printing data and execute a pass different from the certain pass in accordance with the third printing data, at the time of the second processing.

According to such a liquid discharging apparatus, formation of the variable image portion and formation of the coating can be carried out by the same processing.

In such a liquid discharging apparatus, the controller may generate the third printing data on the basis of the number of passes which are carried out when forming the variable image portion, and a printing range onto the medium.

According to such a liquid discharging apparatus, the third printing data can be generated by the liquid discharging apparatus. Accordingly, it is possible to reduce the transfer amount of data, so that it is possible to attain improvement in printing speed.

Further, the controller may generate the third printing data on the basis of the number of passes which are carried out when forming the variable image portion, and a formation range of the common image portion in accordance with the first printing data.

According to such a liquid discharging apparatus, it is possible to save liquid, so that it is possible to reduce costs.

In such a liquid discharging apparatus, it is preferable that the controller acquire information for determining the variable image portion corresponding to each image and generate the second printing data on the basis of the information.

According to such a liquid discharging apparatus, the second printing data can be generated on the liquid discharging apparatus side. Accordingly, it is possible to reduce the transfer amount of data, so that it is possible to attain improvement in printing speed.

In the following embodiments, as the liquid discharging apparatus, a lateral type ink jet printer (hereinafter also referred to as a printer 1) will be taken and described as an example.

Configuration Example of Printer 1

Figure 2:
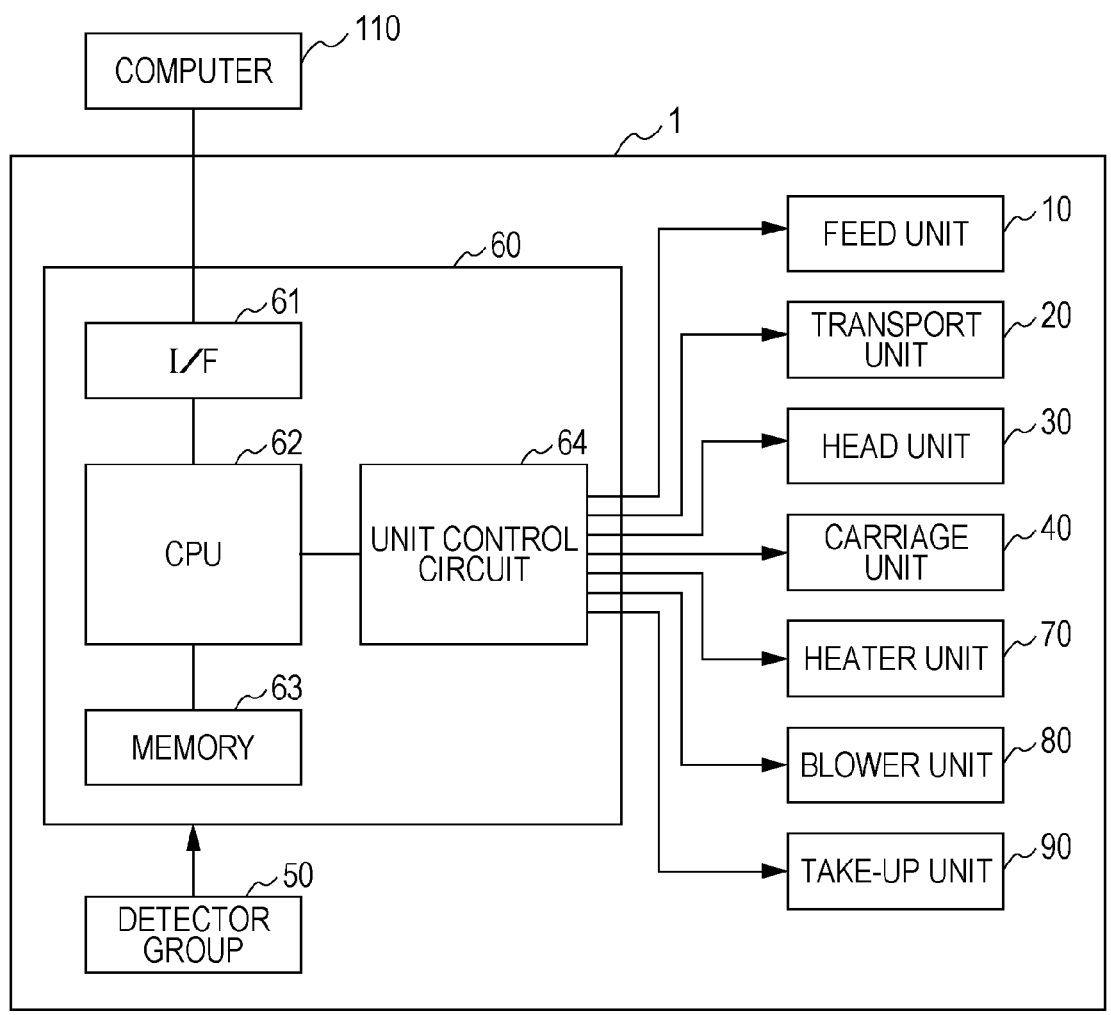
FIG. 2 is a block diagram of the printer.

A configuration example of the printer 1 will be described using FIGS. 1 and 2. FIG. 1 is a schematic cross-sectional view of the printer 1. FIG. 2 is a block diagram of the printer 1.

In addition, in the case of referring to an "up-and-down direction" and a "left-and-right direction" in the following explanation, they are set to be represented with directions indicated by arrows in FIG. 1 as standards. Further, in the case of referring to a "front-and-back direction", it is set to represent a direction perpendicular to the plane of paper in FIG. 1.

Further, in this embodiment, a description will be performed using rolled paper 2 (continuous paper) as a medium on which the printer 1 records an image.

As shown in FIGS. 1 and 2, the printer 1 related to this embodiment has a transport unit 20, and a feed unit 10, a platen 29, and a take-up unit 90, which are disposed along a transport pathway in which the transport unit 20 transports the rolled paper 2, and further includes a head unit 30, a carriage unit 40, a cleaning unit, a flushing unit 35, a heater unit 70, a blower unit 80, a controller 60 which controls these units and the like, thereby taking charge of an operation as the printer 1, and a detector group 50.

The feed unit 10 is for feeding the rolled paper 2 to the transport unit 20. The feed unit 10 includes a winding shaft 18 on which the rolled paper 2 is wound and which is rotatably supported, and a relay roller 19 for making the rolled paper 2 unwound from the winding shaft 18 be wound around it and led to the transport unit 20.

The transport unit 20 is for transporting the rolled paper 2 fed by the feed unit 10 along a preset transport pathway. As shown in FIG. 1, the transport unit 20 includes a relay roller 21 which is located on the horizontally right side with respect to the relay roller 19, a relay roller 22 which is located on the diagonally lower right side when viewed from the relay roller 21, a first transport roller 23 which is located on the diagonally upper right side when viewed from the relay roller 22 (on the upstream side when viewed from the platen 29, in a direction in which the rolled paper 2 is transported), a second transport roller 24 which is located on the right side when viewed from the first transport roller 23 (on the downstream side when viewed from the platen 29, in a direction in which the rolled paper 2 is transported), a reversing roller 25 which is located on the vertically lower side when viewed from the second transport roller 24, a relay roller 26 which is located on the right side when viewed from the reversing roller 25, and a delivery roller 27 which is located on the upper side when viewed from the relay roller 26.

The relay roller 21 is a roller which makes the rolled paper 2 sent from the relay roller 19 be wound around it from the left and then slackened downward.

The relay roller 22 is a roller which makes the rolled paper 2 sent from the relay roller 21 be wound around it from the left and then transports the rolled paper 2 diagonally right and upward.

The first transport roller 23 includes a first driving roller 23a which is driven by a motor (not shown), and a first driven roller 23b disposed so as to face the first driving roller 23a with the rolled paper 2 interposed therebetween. The first transport roller 23 is a roller which draws upward the rolled paper 2 slackened downward and transports the rolled paper 2 to a printing area R which faces the platen 29. The first transport roller 23 is made so as temporarily to stop transportation in a period in which image recording is performed on a site of the rolled paper 2 on the printing area R (that is, as described later, a head 31 discharges ink onto the relevant site of the stopped rolled paper 2 while moving in the left-and-right direction and the front-and-back direction, whereby image recording is performed on the relevant site). In addition, by the driving control of the controller 60, the first driven roller 23b is rotated with the rotational driving of the first driving roller 23a, whereby the transport amount of the rolled paper 2 (the length of the site of the rolled paper) which is located on the platen 29 is adjusted.

The transport unit 20 has a mechanism which slackens downward and transports the site of the rolled paper 2 wound between the relay rollers 21 and 22 and the first transport roller 23, as described above. The slackening of the rolled paper 2 is monitored by the controller 60 on the basis of a detection signal from a slackening detection sensor (not shown). Specifically, in a case where the slackening detection sensor has detected the site of the rolled paper 2 slackened between the relay rollers 21 and 22 and the first transport roller 23, given that tension of an appropriate magnitude is imparted to the site, the transport unit 20 can transport the rolled paper 2 in a slackened state. On the other hand, in a case where the slackening detection sensor does not detect the slackened site of the rolled paper 2, given that tension of an excessive magnitude is imparted to the site, transport of the rolled paper 2 by the transport unit 20 is temporarily stopped and tension is adjusted to an appropriate magnitude.

The second transport roller 24 includes a second driving roller 24a which is driven by a motor (not shown), and a second driven roller 24b disposed so as to face the second driving roller 24a with the rolled paper 2 interposed therebetween. The second transport roller 24 is a roller which transports the site of the rolled paper 2 after an image is recorded by the head unit 30 horizontally rightward along a support surface of the platen 29 and then transports it vertically downward. In this way, the transport direction of the rolled paper 2 is converted. In addition, by the driving control of the controller 60, the second driven roller 24b is rotated with the rotational driving of the second driving roller 24a, whereby a given tension which is imparted to the site of the rolled paper 2 which is located on the platen 29 is adjusted.

The reversing roller 25 is a roller which makes the rolled paper 2 sent from the second transport roller 24 be wound around it from the upper left and then transports the rolled paper 2 diagonally right and upward.

The relay roller 26 is a roller which makes the rolled paper 2 sent from the reversing roller 25 be wound around it from the lower left and then transports upward the rolled paper 2.

The delivery roller 27 is made so as to make the rolled paper 2 sent from the relay roller 26 be wound around it from the lower left and then send the rolled paper 2 to the take-up unit 90.

In this manner, the rolled paper 2 moves sequentially going by way of the respective rollers, whereby a transport pathway for transporting the rolled paper 2 is formed. In addition, the rolled paper 2 is intermittently transported by the transport unit 20 along the transport pathway in an area unit corresponding to the printing area R (that is, intermittent transport is performed every time image recording for one page is performed on the site of the rolled paper 2 on the printing area R).

The head unit 30 is for discharging ink as one example of liquid onto the site of the rolled paper 2 sent to the printing area R on the transport pathway (onto the platen 29) by the transport unit 20. The head unit 30 includes the head 31 (equivalent to a liquid discharging section) and a valve unit 34.

The head 31 has at its lower surface a nozzle row in which nozzles are arranged in a row direction. In this embodiment, the head 31 has a nozzle row composed of a plurality of nozzles #1 to #N, for each color such as yellow (Y), magenta (M), cyan (C), and black (K). The nozzles #1 to #N of each nozzle row are arranged in a linear fashion in an intersection direction (that is, the intersection direction is the above-mentioned row direction) intersecting the transport direction of the rolled paper 2. The respective nozzle rows are disposed parallel to each other at intervals along the transport direction.

The head 31 in this embodiment further has a nozzle row which discharges colorless and transparent clear ink (CL). In this embodiment, the clear ink is used to improve the gloss or the weather resistance of printed matter by coating the surface of an image. In addition, the nozzle row which discharges the clear ink also has the same configuration as that of each nozzle row for CMYK.

In each of the nozzles #1 to #N, as a driving element for discharging an ink droplet, a piezo element (not shown) is provided. If voltage having a predetermined duration is applied between electrodes provided at both ends of the piezo element, the piezo element extends depending on an application time of the voltage, thereby deforming a side wall of an ink flow path. Accordingly, the volume of the ink flow path contracts depending on extension of the piezo element and ink equivalent to the contraction amount turns into an ink droplet, thereby being discharged from each of the nozzles #1 to #N for each color.

Further, the head 31 is made so as to be able to reciprocate in the transport direction (that is, the left-and-right direction) and the row direction (that is, the front-and-back direction), as described later.

The valve unit 34 is for temporarily storing ink and is connected to the head 31 through an ink supply tube (not shown). For this reason, the head 31 can perform image recording by discharging ink supplied from the valve unit 34 from the nozzles toward the site of the rolled paper 2 in the state of being transported onto and stopped on the platen 29.

The carriage unit 40 is for moving the head 31. The carriage unit 40 has a carriage guide rail 41 (shown by a two-dot chain line in FIG. 1) which extends in the transport direction (the left-and-right direction), a carriage 42 supported so as to be able to reciprocate in the transport direction (the left-and-right direction) along the carriage guide rail 41, and a motor (not shown).

The carriage 42 is configured so as to move in the transport direction (the left-and-right direction) together with the head 31 by the driving of the motor (not shown). Further, a head guide rail (not shown) which extends in the row direction (the front-and-back direction) is provided at the carriage 42, and the head 31 is configured so as to move in the row direction (the front-and-back direction) along the head guide rail by the driving of the motor.

The cleaning unit (not shown) is for cleaning the head 31. The cleaning unit is provided at a home position (hereinafter referred to as HP, refer to FIG. 1) and includes a cap, a suction pump, and the like. If the head (the carriage 42) moves in the transport direction (the left-and-right direction) and is then located at the HP, the cap (not shown) comes into close contact with the lower surface (nozzle surface) of the head 31. If the suction pump is operated in a state where the cap is in close contact with the lower surface of the head 31 in this manner, ink in the head 31 is suctioned along with thickened ink or paper dust. In this way, a clogged nozzle is recovered from a non-discharging state, so that cleaning of the head is completed.

Further, the flushing unit 35 is provided between the HP and the platen 29 in the transport direction (the left-and-right direction), and if the head 31 (the carriage 42) moves in the transport direction (the left-and-right direction) and is then located at a position which faces the flushing unit 35, the head 31 carries out a flushing operation of performing flushing by discharging ink from each nozzle belonging to the nozzle row.

The platen 29 is for supporting the site of the rolled paper 2 which is located at the printing area R on the transport pathway and also heating the site. The platen 29 is provided corresponding to the printing area R on the transport pathway and disposed at an area along the transport pathway between the first transport roller 23 and the second transport roller 24, as shown in FIG. 1. Then, the platen 29 receives supply of heat generated by the heater unit 70, thereby being able to heat the site of the rolled paper 2.

The heater unit 70 is for heating the rolled paper 2 and has a heater (not shown). The heater has a nichrome wire and is constituted by disposing the nichrome wire in the inside of the platen 29 so as to be at a certain distance from the support surface of the platen 29. For this reason, the heater is energized, whereby the nichrome wire itself generates heat, and the heat can be conducted to the site of the rolled paper 2 which is located on the support surface of the platen 29. Since the heater is constituted such that the nichrome wire is built in the whole area of the platen 29, the heat can be uniformly conducted to the site of the rolled paper 2 on the platen 29. In this embodiment, the site of the rolled paper 2 is uniformly heated such that the site of the rolled paper 2 on the platen 29 has a temperature of 45° C. Accordingly, it is possible to dry ink landed on the site of the rolled paper 2.

The blower unit 80 is for sending the air onto the rolled paper 2 on the platen 29. The blower unit 80 is provided with a fan 81 and a motor (not shown) for rotating the fan 81. The fan 81 is for drying ink landed on the rolled paper 2 by sending the air onto the rolled paper 2 on the platen 29 by rotation. The fan 81 is provided in a plurality at an openable and closable cover (not shown) provided at a main body section, as shown in FIG. 1. Then, when the cover is closed, the respective fans 81 are located above the platen 29 so as to face the support surface of the platen 29 (the rolled paper 2 on the platen 29).

The take-up unit 90 is for taking up the rolled paper 2 (image-recorded rolled paper) sent by the transport unit 20. The take-up unit 90 includes a relay roller 91 for making the rolled paper 2 sent from the delivery roller 27 be wound around it from the upper left and then transporting the rolled paper 2 diagonally right and downward, and a take-up driving shaft 92 which is rotatably supported and takes up the rolled paper 2 sent from the relay roller 91.

The controller 60 is a control unit for performing control of the printer 1. As shown in FIG. 2, the controller 60 includes an interface section 61, a CPU 62, a memory 63, and a unit control circuit 64. The interface section 61 is for performing transmission and reception of data between a host computer 110 that is an external apparatus and the printer 1. In addition, as the data that the printer 1 receives from the host computer 110, there is printing data, command data, or the like.

The CPU 62 is an arithmetic processing unit for performing control of the entire printer 1. The memory 63 is for securing an area which stores a program of the CPU 62, a working area, or the like. The CPU 62 controls each unit by the unit control circuit 64 in accordance with the program stored in the memory 63.

The detector group 50 is for monitoring the conditions of the inside of the printer 1 and includes a rotary type encoder which is mounted on, for example, a transport roller and used for control of transport or the like of a medium, a paper detection sensor which detects the presence or absence of the medium which is transported, a linear type encoder for detecting the position in the transport direction (the left-and-right direction) of the carriage 42 (or the head 31), and the like.

Operation Example of Printer 1

As described above, in the printer 1 related to this embodiment, the head 31 having the nozzle rows each having the nozzles arranged in the row direction (the front-and-back direction) is provided. Then, the controller 60 discharges ink from the nozzles while moving the head 31 in the transport direction (the left-and-right direction), thereby forming the raster lines along the transport direction (the left-and-right direction), whereby image recording for one page is performed on the site of the rolled paper 2 on the printing area R.

Here, the controller 60 related to this embodiment carries out printing of plural passes (two passes, four passes, or the like). That is, in order to increase the resolution of an image in the row direction, the position of the head 31 in the row direction is changed little by little for each pass and printing is then performed. Further, as an image forming method, for example, a known interlaced (micro-weave) printing is carried out.

Figure 3:
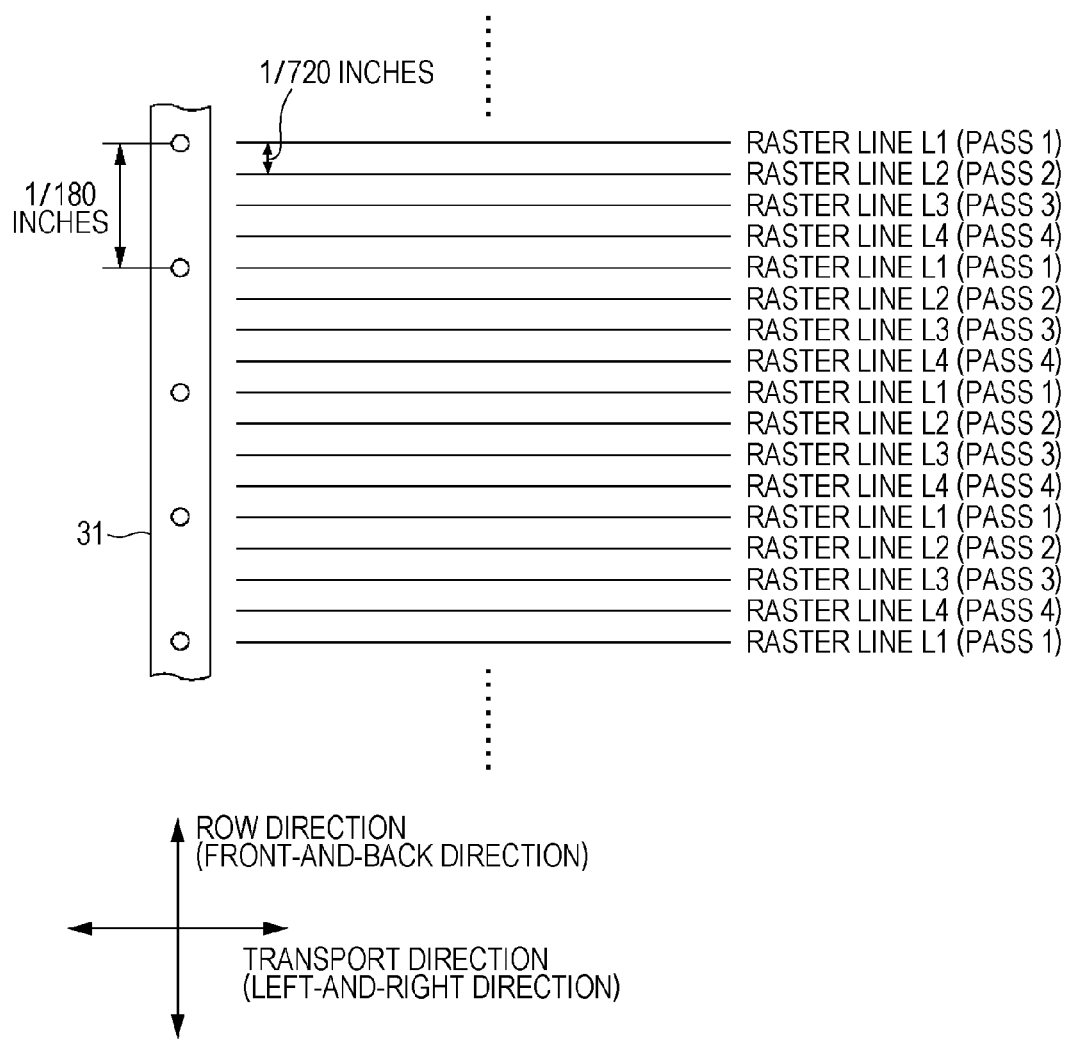
FIG. 3 is a schematic diagram illustrating raster lines which are formed in the respective passes in the case of performing printing by four passes.
Figure 4:
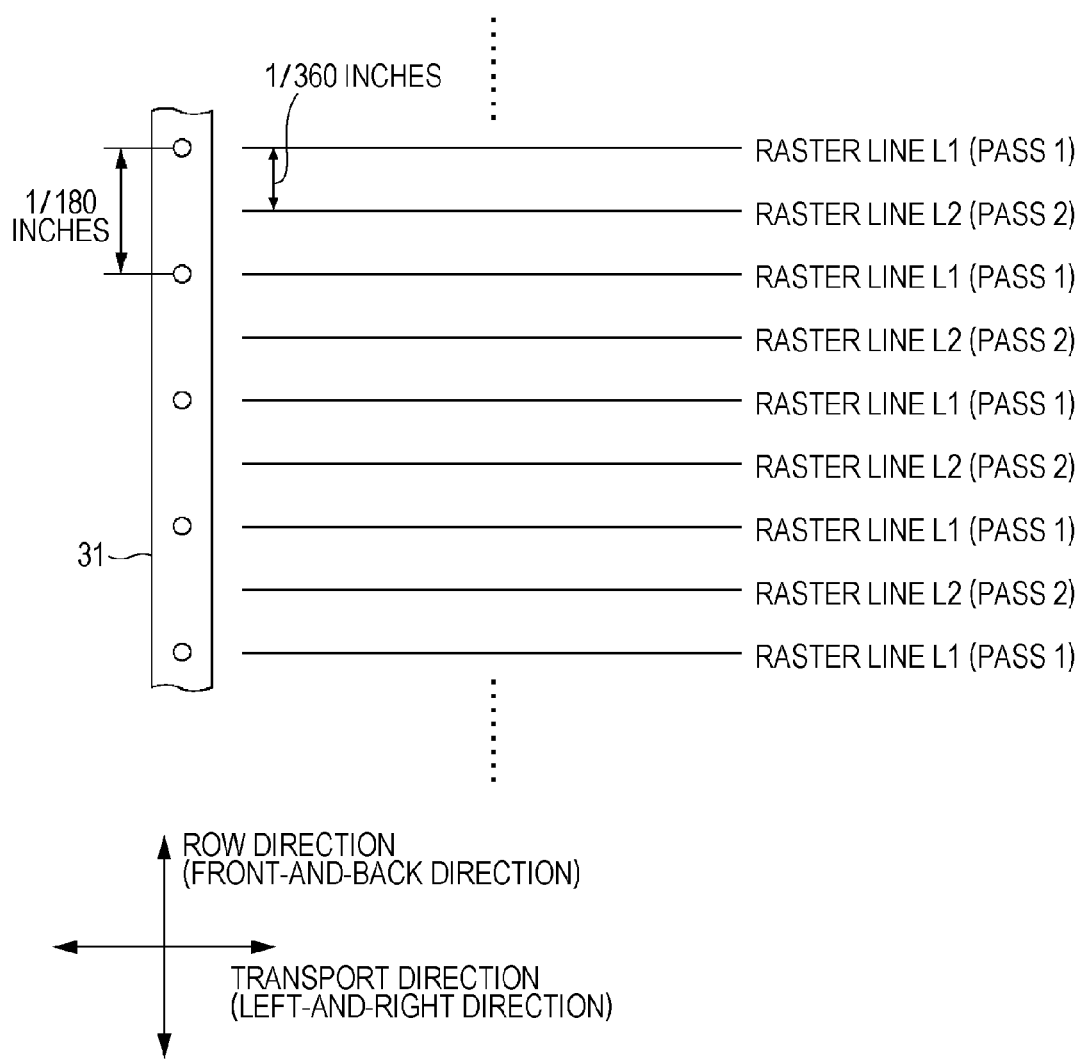
FIG. 4 is a schematic diagram illustrating raster lines which are formed in the respective passes in the case of performing printing by two passes.

This will be more specifically described using FIGS. 3 and 4. FIG. 3 is a schematic diagram illustrating the raster lines which are formed in the respective passes in the case of performing printing by four passes. FIG. 4 is a schematic diagram illustrating the raster lines which are formed in the respective passes in the case of performing printing by two passes.

On the left side of each of FIGS. 3 and 4, the nozzle row (the nozzles) of the head 31 is shown, and ink is discharged from the nozzles while the head 31 (the nozzle row) moves in the transport direction, whereby the raster lines are formed.

Case of 4-Pass

The position in the row direction of the head 31 (the nozzle row) which is shown in FIG. 3 is a position at the time of the first pass, and if the head 31 (the nozzle row) moves in the transport direction while maintaining such a position, printing of the first pass is carried out, so that five raster lines (raster lines L1 with Pass 1 written at the right end) shown in the drawing are formed.

Next, if the head 31 (the nozzle row) moves in the row direction and the head 31 (the nozzle row) then moves in the transport direction while maintaining the position after the movement, printing of the second pass is carried out, so that four raster lines (raster lines L2 with Pass 2 written at the right end) shown in the drawing are formed. In addition, since the interlaced (micro-weave) printing is adopted, the raster line L2 adjacent to the raster line L1 is formed by ink discharged from the nozzle different from the nozzle discharged ink which forms the raster line L1. For this reason, the movement distance in the row direction of the head 31 (the nozzle row) is not $1/4$ ($1/180 \times 1/4 = 1/720$ inches) of the distance (for example, $1/180$ inches) between the nozzles, but becomes a distance larger than this.

Thereafter, the same operation is performed, whereby printing of the third pass and printing of the fourth pass are carried out, so that the remaining raster lines (raster lines L3 with Pass 3 written at the right end and raster lines L4 with Pass 4 written at the right end) shown in the drawing are formed. In this manner, the raster lines are formed by four passes, whereby it becomes possible to make the resolution of an image in the row direction become fourfold ($=720 \div 180$) resolution.

Case of 2-Pass

The position in the row direction of the head 31 (the nozzle row) which is shown in FIG. 4 is a position at the time of the first pass, similarly to the case of the 4-pass (FIG. 3), and if the head 31 (the nozzle row) moves in the transport direction while maintaining such a position, printing of the first pass is carried out, so that five raster lines (raster lines L1 with Pass 1 written at the right end) shown in the drawing are formed.

Next, if the head 31 (the nozzle row) moves in the row direction and the head 31 (the nozzle row) then moves in the transport direction while maintaining the position after the movement, printing of the second pass is carried out, so that four raster lines (raster lines L2 with Pass 2 written at the right end) shown in the drawing are formed. Here also, since the interlaced (micro-weave) printing is adopted, the raster line L2 adjacent to the raster line L1 is formed by ink discharged from the nozzle different from the nozzle discharged ink which forms the raster line L1. For this reason, the movement distance in the row direction of the head 31 (the nozzle row) is not $1/2$ ($1/180 \times 1/2 = 1/360$ inches) of the distance (for example, $1/180$ inches) between the nozzles, but becomes a distance larger than this.

In this manner, each raster line is formed by two passes. As can be seen from the drawing, the resolution of an image in the row direction in the case of the 2-pass becomes $1/2$ of the resolution in the case of the 4-pass. However, in the case of performing printing on the same printing area, a printing time onto the printing area in the case of the 2-pass becomes shorter than that in the case of the 4-pass.

In this embodiment, so-called bidirectional printing is set to be performed in which the movement direction of the head 31 (the nozzle row) when printing of an odd-numbered pass is performed and the movement direction of the head 31 (the nozzle row) when printing of an even-numbered pass is performed are opposite directions. In addition, the invention is not limited thereto and the movement direction of the head 31 (the nozzle row) when printing of an odd-numbered pass is performed and the movement direction of the head 31 (the nozzle row) when printing of an even-numbered pass is performed may also be the same (so-called unidirectional printing).

Further, in this embodiment, by performing overprinting on the same print side by using a plurality of sets of printing data, print format printing which forms an image composed of a plurality of print formats is performed. In addition, the print format is data for single print processing in the case of performing overprinting in order to create a picture on a print side. Further, a print side for one page which is produced by overlapping the print formats is also referred to as a frame.

Printed Image

Figures 5, 6A, 6B:
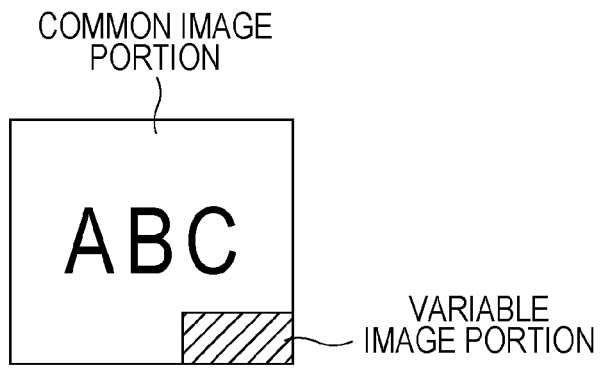
FIG. 5 is a diagram illustrating an image which is printed on rolled paper.
FIGS. 6A and 6B are diagrams illustrating printing data for one frame in Comparative Example 1.

FIG. 5 is a diagram illustrating one example of an image which is printed on the rolled paper 2 in this embodiment. In the following embodiments, an image (a label) shown in FIG. 5 is printed in a large number in one frame. A symbol "ABC" of the image shown in FIG. 5 is an image site common to a plurality of images which is printed in one frame. Hereinafter, this image site is also referred to as a common image portion. Further, a hatched portion of the image shown in FIG. 5 is an image site which differs in each of the plurality of images which is printed in one frame, such as a bar-code or numbering, for example. Hereinafter, this image site is also referred to as a variable image portion.

Further, in this embodiment, coating of an image by applying colorless and transparent clear ink (hereinafter also referred to as clear ink) to the surface of the image is also performed. In the following explanation, this coating is also referred to as OP (overprint).

First Embodiment

Before a first embodiment is described, first, comparative examples will be described.

Comparative Example 1

FIGS. 6A and 6B are diagrams illustrating printing data for one frame in Comparative Example 1. In Comparative Example 1, an image of one frame is composed of data of two print formats. That is, as shown in FIGS. 6A and 6B, an image of one frame is composed of printing data (printing data PD1) of the first print format and printing data (printing data PD2) of the second print format. As shown in the drawings, in the printing data for one frame, data for forming the image of FIG. 5 is included by twenty (four vertically×5 horizontally). In other words, by performing printing of one frame, twenty images of FIG. 5 are formed. This is also the same in the following embodiments. In addition, in Comparative Example 1, each of print processing by the printing data PD1 and print processing by the printing data PD2 is performed by four passes.

The printing data PD1 is data for printing (hereinafter also referred to as color-printing) a colored image by ink of CMYK. In the printing data PD1 in Comparative Example 1, data for forming the common image portion (the symbol "ABC") and data for forming the variable image portion (the hatched portion in the drawing) are included.

The printing data PD2 is data for forming a transparent coating (OP) on the surface of an image by clear ink. The printing data PD2 in Comparative Example 1 is data which applies (so-called solid-prints) clear ink on the entire print side (printing area).

Figures 7, 8:
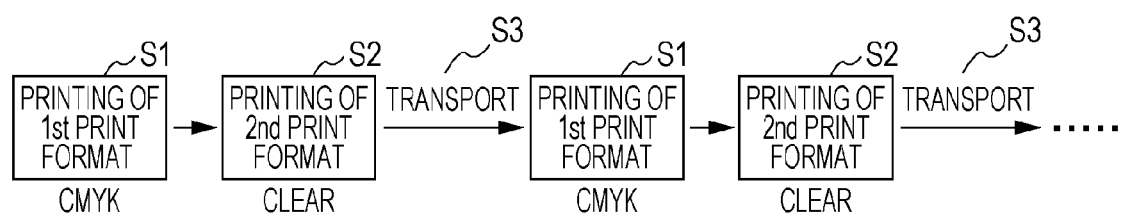
FIG. 7 is a schematic diagram illustrating a printing process in Comparative Example 1.
FIG. 8 is a diagram illustrating printed matter formed by print processing related to Comparative Example 1.

FIG. 7 is a schematic diagram illustrating a printing process in Comparative Example 1. First, the controller 60 performs print processing of the first print format which forms the common image portion (the symbol "ABC") and the variable image portion (the hatched lines) on the print side of the rolled paper 2 by CMYK-based ink on the basis of the printing data PD1 shown in FIG. 6A by four passes (S1). Next, print processing of the second print format which applies the clear ink to the whole of the print side after the printing of the first print format on the basis of the printing data PD2 is performed by four passes (S2). By the print processing of the first print format and the second print format, printing for one frame is finished. If the printing for one frame is finished, the controller 60 transports the rolled paper 2 up to a printing position of the next page (S3). Thereafter, S1 to S3 are repeated sequentially.

FIG. 8 is a diagram illustrating printed matter (for one frame) formed by the print processing related to Comparative Example 1. In the drawing, a portion coated (OP) by the clear ink is shown by light gray. As shown in the drawing, twenty labels each having the common image portion (the symbol "ABC") and the variable image portion (the hatched portion) formed therein are printed in one frame. Further, in Comparative Example 1, the whole area of the print side is coated by the clear ink.

In the case of Comparative Example 1, in the printing data PD1, data for forming the variable image portion is included. That is, the printing data PD1 in one frame differs for each image. Accordingly, the common image portion has to acquire (receive) the printing data PD1 for the next frame from the host computer 110 every time printing for one frame is performed, despite being common (the same data) in each image. For this reason, in a case where data of the common image portion is large, the time it takes to transfer data between the host computer 110 and the printer 1 is increased (a transfer time is rate-limited), such that there is concern that the printing speed may be decreased.

Comparative Example 2

FIGS. 9A to 9C are diagrams illustrating printing data for one frame in Comparative Example 2. In Comparative Example 2, an image of one frame is composed of data of three print formats. That is, as shown in FIGS. 9A to 9C, an image of one frame is composed of printing data (printing data PD1') of the first print format, printing data (printing data PD1") of the second print format, and printing data (printing data PD2) of the third print format. In addition, in Comparative Example 2, each print processing by the printing data PD1', the printing data PD1", and the printing data PD2 is performed by four passes.

The printing data PD1' is data for performing color-printing by ink of CMYK. However, the printing data PD1 in Comparative Example 1 is data for forming the common image portion (the symbol "ABC") and the variable image portion (the hatched portion), whereas the printing data PD1' is made to be data for forming the common image portion only.

The printing data PD1" is data for printing (hereinafter referred to as monochrome-printing) the variable image portion such as a bar-code by, for example, K ink only.

The printing data PD2 is data for forming OP by the clear ink. Since this is the same as that in Comparative Example 1, explanation thereof is omitted.

FIG. 10 is a schematic diagram illustrating a printing process in Comparative Example 2. First, the controller 60 performs print processing of the first print format which forms a painting, a character, or the like (here, the symbol "ABC") on the print side of the rolled paper 2 by CMYK-based ink on the basis of the printing data PD1' shown in FIG. 9A by four passes (S1). Next, print processing of the second print format which forms the variable image portion (the hatched portion) such as a bar-code on the print side after the printing of the first print format by K ink on the basis of the printing data PD1" is performed by four passes (S2). Further, print processing of the third print format which applies the clear ink to the print side after the printing of the second print format on the basis of the printing data PD2 is performed by four passes (S3). By the print processing of the first to third print formats, printing for one frame is finished. If the printing for one frame is finished, the controller 60 transports the rolled paper 2 up to a printing position of the next page (S4). Thereafter, S1 to S4 are repeated sequentially. In addition, since an image (printed matter) which is formed by Comparative Example 2 is the same as that in Comparative Example 1 (FIG. 8), explanation thereof is omitted.

In the case of Comparative Example 2, the printing data PD1' which is used at the time of the printing of the first print format is data of the common image portion only. That is, since it is the same data regardless of a frame, if the printer 1 acquires (receives) the printing data PD1' once from the host computer 110, by storing the data in, for example, the memory 63, it can also be used at the time of printing of the next page. Accordingly, since transfer of the data (the printing data PD1') of the common image portion need not be performed for each frame, it is possible to reduce the transfer amount of data when printing each page, compared to Comparative Example 1. However, in Comparative Example 2, one print format is added further than that in Comparative Example 1 and print processing for three print formats (a total of 12 passes) is performed. For this reason, even in Comparative Example 2, there is concern that the printing speed may be decreased.

In this manner, in Comparative Example 1 and Comparative Example 2, processing (image formation coating processing) of forming the image shown in FIG. 5 in a plurality in one frame and also performing coating of the images is performed. However, at the time of this processing, there is concern that the printing speed may be decreased. Therefore, the embodiments described below aim to improve the printing speed.

Printing Data in First Embodiment

Since printing (monochrome printing) of a bar-code or coating processing (clear-printing) is printing by monochromatic ink, compared to the printing data PD1 for printing a character or a painting, even coarse resolution is acceptable. Therefore, in this embodiment, printing of the common image portion is performed by printing (for example, 4-pass) providing high resolution, and printing of the variable image portion and the coating is performed by printing (for example, 2-pass) providing lower resolution than that in the printing of the common image portion.

FIGS. 11A to 11C are diagrams illustrating printing data for one frame in a first embodiment. In the first embodiment, an image of one frame is composed of data of three print formats, similarly to Comparative Example 2. That is, as shown in FIGS. 11A to 11C, each of images (twenty images) for one frame is composed of printing data (printing data PD11) of the first print format, printing data (printing data PD12) of the second print format, and printing data (printing data PD13) of the third print format.

In addition, the print data PD11 corresponds to the printing data PD1' in Comparative Example 2, the print data PD12 corresponds to the printing data PD1" in Comparative Example 2, and the print data PD13 corresponds to the printing data PD2 in Comparative Example 2. However, in this embodiment, compared with Comparative Example 2, the number of passes of the second print format and the number of passes of the third print format are different from those in Comparative Example 2. Specifically, in Comparative Example 2, printing of the second print format (the variable image portion) and printing of the third print format (OP) are performed by 4-pass which is the same as that in printing of the first print format (the common image portion), whereas in this embodiment, setting is made such that printing of the second print format and printing of the third print format are performed by 2-pass smaller than that in printing of the first print format. Accordingly, printing for one frame is performed by a total of eight passes (four passes+two passes+two passes).

Print Processing in First Embodiment

FIG. 12 is a schematic diagram illustrating a printing process in the first embodiment.

First, the controller 60 performs print processing of the first print format which forms the symbol "ABC" (the common image portion) on the print side of the rolled paper 2 by CMYK-based ink on the basis of the printing data PD11 shown in FIG. 11A by four passes (S11). Next, print processing of the second print format which forms the variable image portion (the hatched portion) such as a bar-code on the print side after the printing of the first print format by K ink on the basis of the printing data PD12 is performed by two passes (S12). Further, print processing of the third print format which applies the clear ink to the print side after the printing of the second print format on the basis of the printing data PD13 is performed by two passes (S13). By the print processing of the first to third print formats, printing for one frame is finished. If the printing for one frame is finished, the controller 60 transports the rolled paper 2 up to a printing position of the next page (S14). Thereafter, S11 to S14 are repeated sequentially.

Comparing this embodiment with Comparative Example 2, both perform printing of three print formats for formation of one frame. However, in Comparative Example 2, the number of passes is a total of twelve passes, whereas in this embodiment, it is a total of eight passes. In this manner, in this embodiment, since the number of passes is smaller than that in Comparative Example 2, it is possible to shorten the printing time of one frame and it is possible to attain improvement in printing speed. Further, comparing with Comparative Example 1, the number of passes required for printing of one frame is the same (eight passes). However, in Comparative Example 1, the printing data PD1 which includes the common image portion needs to be transferred for each frame, whereas in this embodiment, data (the printing data PD11") of the common image portion is stored in, for example, the memory 63 or the like, thereby being able to be repeatedly used. Accordingly, the transfer amount of data from the host computer 110 to the printer 1 can be reduced. Accordingly, improvement in printing speed can be attained.

In addition, printed matter which is formed by the print processing related to the first embodiment is the same as printed matter (refer to FIG. 8) which is formed in Comparative Example 1. That is, printed matter in which both the common image portion and the variable image portion are coated can be obtained.

In this manner, according to this embodiment, since the number of passes for forming the variable image portion and the number of passes for forming OP are set to be smaller than the number of passes for forming the common image portion, improvement in printing speed can be attained.

Modified Example of First Embodiment

In the first embodiment, the common image portion, the variable image portion, and OP are respectively formed by separate print formats. However, in this modified example, the variable image portion and OP are formed by the same print format (the same print processing).

FIGS. 13A and 13B are diagrams illustrating printing data for one frame in the modified example of the first embodiment.

Printing data of the first print format is the same printing data (the printing data PD11) as that in the first embodiment.

Further, in this modified example as well, the printing data PD12 and the printing data PD13 in the first embodiment are used. However, in this modified example, printing of the second print format is performed by switching the printing data PD12 and the printing data PD13 according to a pass. In addition, print processing of the second print format is set to be performed by 4-pass that is the same as that in the first print format. In this case, instead of formation of the raster lines by 4-pass shown in FIG. 3, formation of the raster lines by 2-pass shown in FIG. 4 is performed twice. That is, 2-pass of the first half among four passes performs formation of the variable image portion by the printing data PD12 and 2-pass of the second half performs formation of OP by the printing data PD13.

FIG. 14 is a schematic diagram illustrating a printing process in the modified example of the first embodiment.

First, the controller 60 performs print processing of the first print format which forms the symbol "ABC" (the common image portion) on the print side of the rolled paper 2 by CMYK-based ink on the basis of the printing data PD11 shown in FIG. 13A by four passes (S21). Next, print processing of the second print format is performed on the print side after the printing of the first print format by four passes (S22). In addition, in this modified example, 2-pass of the first half among four passes of the second print format forms the variable image portion (the hatched portion) such as a bar-code by K ink on the basis of the printing data PD12 (S221) and 2-pass of the second half applies the clear ink on the basis of the printing data PD13 (S222). By the print processing of the first and second print formats, printing for one frame is finished. If the printing for one frame is finished, the controller 60 transports the rolled paper 2 up to a printing position of the next page (S23). Thereafter, S21 to S23 are repeated sequentially.

In this manner, in the modified example of the first embodiment, formation of the variable image portion and formation of OP are performed using the printing data PD12 and the printing data PD13 by the same print format. Then, in this modified example as well, each of the number of passes when forming the variable image portion and the number of passes when forming OP is set so as to be smaller than the number of passes when forming the common image portion. Accordingly, improvement in printing speed can be attained.

Second Embodiment

In the first embodiment, a configuration is made such that the controller 60 of the printer 1 receives each set of printing data from the host computer 110 at the time of printing. In contrast to this, in a second embodiment, a configuration is made such that the printing data PD13 for forming OP is generated on the printer side.

The printing data of each print format or the print processing in the second embodiment is the same as that in the first embodiment. However, in the first embodiment, each printing data is received from the host computer 110, whereas in the second embodiment, the printing data PD13 for forming OP is generated on the printer side.

In the second embodiment, if the controller 60 receives the printing data PD12 of the variable image portion from the host computer 110, it generates the printing data PD13 of OP on the basis of the printing data. For example, the controller 60 generates the printing data PD13 for applying the clear ink to the entire printing range in one frame with reference to the printing data PD12 of the variable image portion. More specifically, the controller 60 generates the printing data PD13 for discharging the clear ink from each nozzle of the nozzle row for the clear ink of the head 31 to the entire printing range by making a print start position or the number of passes at the time of formation equal to that in the variable image portion (the printing data PD12).

In this way, since the transfer amount of data from the host computer 110 to the printer 1 can be reduced, improvement in printing speed can be attained.

Modified Example of Second Embodiment

In the second embodiment described above, a configuration is made such that OP is formed on the entire printing range. However, in this modified example, a formation range of OP differs. In this modified example, the controller 60 on the printer 1 side generates the printing data PD13 of OP for discharging the clear ink to a formation range of the common image portion in the same number of passes as the number of passes which form the variable image portion, on the basis of the printing data PD11 and the printing data PD12.

In addition, in the modified example of the second embodiment, printed matter in which OP is formed on the common image portion and OP is not formed on the variable image portion is produced.

In this way, since a range in which the clear ink is discharged can be reduced, ink can be saved, so that a reduction in costs can be attained.

Third Embodiment

In the second embodiment, the printing data (the printing data PD13) of OP is generated on the printer 1 side. However, in the third embodiment, a configuration is made such that in addition, the data (the printing data PD12) of the variable image portion is also generated on the printer 1 side.

In the third embodiment, the printing data of each print format is the same as those in the embodiments described above. Further, the print processing is also the same as those in the embodiments described above. However, in the third embodiment, the printing data PD12 for forming the variable image portion and the printing data PD13 for forming OP are generated on the printer 1 side.

In the third embodiment, the host computer 110 transmits data (for example, a list of the variable image portions or a command of generation of printing data) representing information for determining the variable image portion corresponding to each image, along with printing data to the printer 1. If the controller 60 of the printer 1 receives the data, the controller 60 analyzes the command in the data and generates the printing data PD12 of the variable image portion. For example, in a case where the controller 60 receives a list of bar-codes, it generates a bar-code depending on the list and generates the printing data PD12 with the bar-code sequentially assigned to a specific position of each image. Further, in a case where the variable image portion is numbering, numbers are assigned to the respective images in a given order. For example, the first number is set with the upper-left image of the first frame as a start position, and with respect to an image on the right, the number is increased by one. Similarly, as it goes to images on the right, the number is increased one by one, and if it reaches the right end, the number is increased and set in order from the leftmost image of the lower stage. In this way, the controller 60 generates the printing data PD12 of the variable image portion. Further, with respect to the next frame as well, the printing data PD12 of the variable image portion is generated in the same way.

Further, the printing data PD13 can be generated on the printer 1 side in the same way as the second embodiment.

In this way, since the printing data PD12 for forming the variable image portion also need not be transferred from the host computer 110, the transfer amount of data can be further reduced. Accordingly, improvement in printing speed can be attained.

Other Embodiments

The above embodiments mainly describe the liquid discharging apparatus. However, disclosure of a liquid discharging method or the like is also included therein. Further, the above embodiments are for facilitating understanding of the invention and should not be construed as limiting the invention thereto. The invention can be modified and improved without departing from the purpose thereof and it goes without saying that the equivalents thereto are included in the invention. In particular, embodiments which are described below are also included in the invention.

Liquid Discharging Apparatus

In the embodiments described above, as one example of the liquid discharging apparatus, an ink jet printer has been described. However, the liquid discharging apparatus is not limited to the ink jet printer and the invention can be embodied to liquid discharging apparatuses which discharge fluids (liquid, a liquid body in which particles of a functional material are dispersed, and a fluid body such as gel) other than ink. The same technique as the embodiments described above may also be applied to various apparatuses in which an ink jet technique is applied, such as a color filter manufacturing apparatus, a dyeing apparatus, a micro-fabrication apparatus, a semiconductor manufacturing apparatus, a surface fabrication apparatus, a three-dimensional modeling device, a gas vaporizer, an organic EL manufacturing apparatus (especially, a polymer EL manufacturing apparatus), a display manufacturing apparatus, a film formation apparatus, and a DNA chip manufacturing apparatus, for example. Further, methods or manufacturing methods of these are also in the category of an application range.

Ink

Since the embodiments described above are embodiments of a printer, ink is discharged from the nozzle. However, the ink may also be aqueous ink and may also be oil-based ink. Further, liquid which is discharged from the nozzle is not limited to ink. For example, liquid (including water) which contains a metal material, an organic material (especially, a polymer material), a magnetic material, an electrically-conductive material, a wiring material, a film formation material, electronic ink, a working solution, a genetic solution, or the like may also be discharged from the nozzle.

Discharging Method

In the embodiments described above, ink is discharged using a piezoelectric element (a piezo element). However, a method of discharging liquid is not limited thereto. Other methods such as a method of generating bubbles in a nozzle by heat, for example, may also be used.

Coating

In the embodiments described above, coating of an image is performed using colorless and transparent clear ink. However, it is not limited thereto. Formation of the coating may also be performed by applying, for example, translucent color ink.

Further, in the embodiments described above, formation of the common image portion, formation of the variable image portion, and formation of the coating are performed in this order. However, it is not limited thereto. For example, in FIG. 11A to 11C, the order of the second print format and the third print format may also be reversed. In this case, after formation of the common image portion, formation of the coating of the common image portion is performed, and thereafter, the variable image portion is formed.

Image

In the embodiments described above, as the common image portion, the symbol "ABC" is printed. However, it is not limited thereto and a painting, a graphic, or the like is also acceptable. In addition, the larger the data volume of the common image portion is, the more the effects by the embodiments described above become conspicuous.

Number of Passes

In the embodiments described above, the common image portion is formed by four passes and the variable image portion and the coating are formed by two passes. However, the invention is not limited thereto and it is acceptable if each of the variable image portion and the coating is formed in the number of passes smaller than that in the common image portion. For example, a configuration may also be made such that the common image portion is formed by eight passes, the variable image portion is formed by four passes, and the coatings are formed by two passes.

What is claimed is:

1. A liquid discharging apparatus comprising:
a liquid discharging section which performs a liquid discharging operation for discharging liquid; and
a controller which forms a plurality of images on a medium and forms coating of the images, by executing a pass which makes the liquid discharging section perform the liquid discharging operation while moving the liquid discharging section in a movement direction,
wherein the controller forms a common image portion that is an image site common to each of the plurality of images by a predetermined number of passes and forms each of a variable image portion that is an image site which differs in each of the plurality of images and the coating of the images by a number of passes smaller than the predetermined number,
wherein the controller:
performs first processing of forming the common image portion on the medium on the basis of first printing data and second processing of forming the variable image portion on the medium on the basis of second printing data and also forming the coating of the images on the basis of third printing data, and
executes a certain pass in accordance with the second printing data and executes a pass different from the certain pass in accordance with the third printing data, at the time of the second processing.

2. The liquid discharging apparatus according to claim 1, wherein the controller generates the third printing data on the basis of the number of passes which are carried out when forming the variable image portion, and a printing range onto the medium.

3. The liquid discharging apparatus according to claim 1, wherein the controller generates the third printing data on the basis of the number of passes which are carried out when forming the variable image portion, and a formation range of the common image portion in accordance with the first printing data.

4. The liquid discharging apparatus according to claim 1, wherein the controller acquires information for determining the variable image portion corresponding to each image and generates the second printing data on the basis of the information.

* * * * *